Nov. 9, 1948.  D. R. BABBITT  2,453,613
SANITARY FILTER
Filed April 26, 1945  7 Sheets-Sheet 1

Inventor
Daniel R. Babbitt
By McCallb, Wendt & Dickinson
Attys

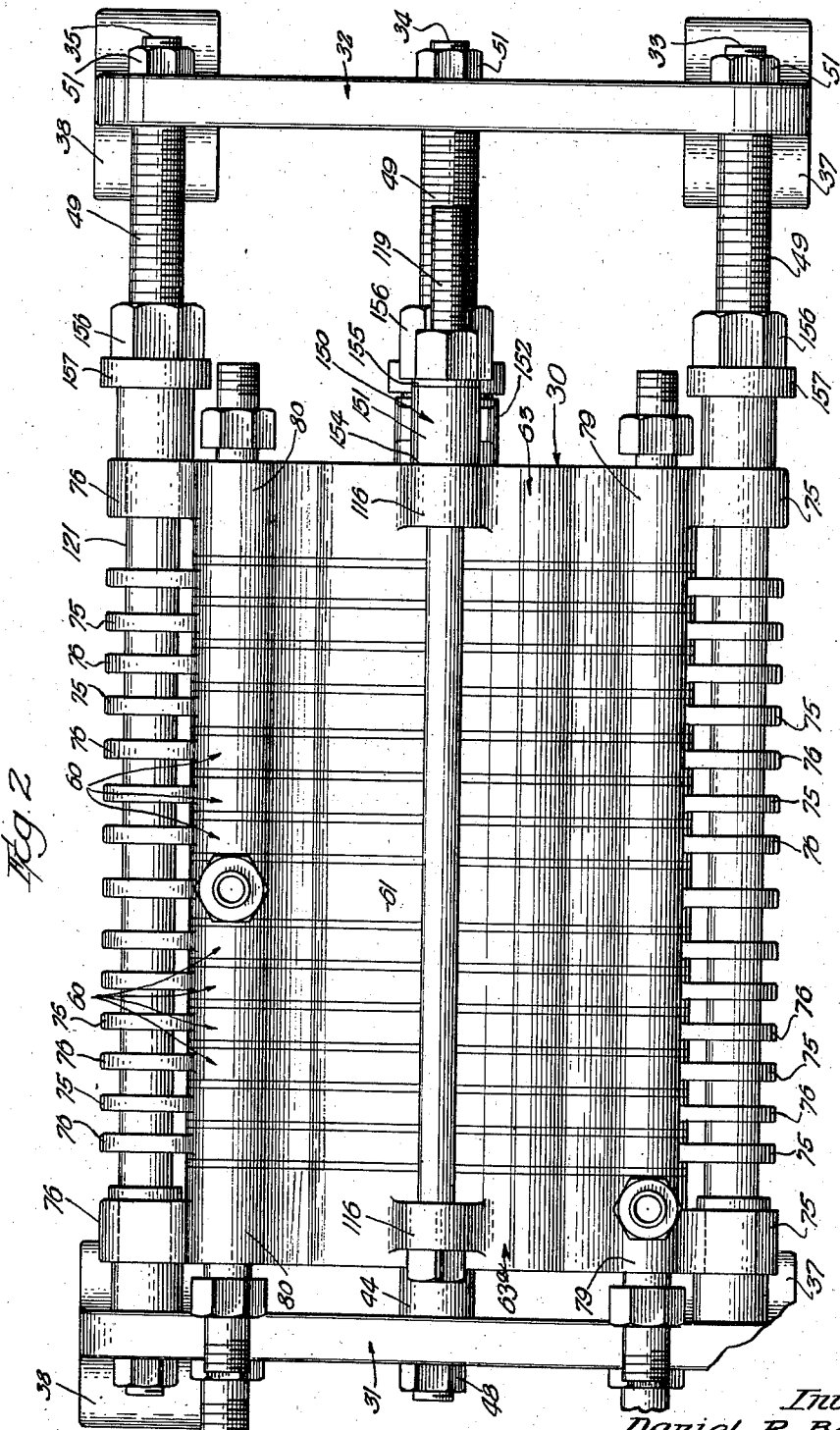

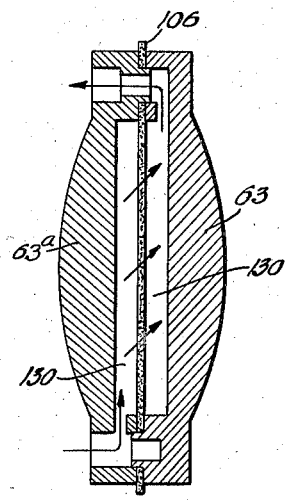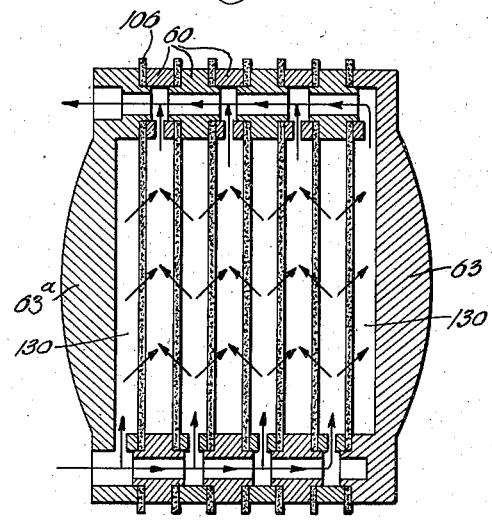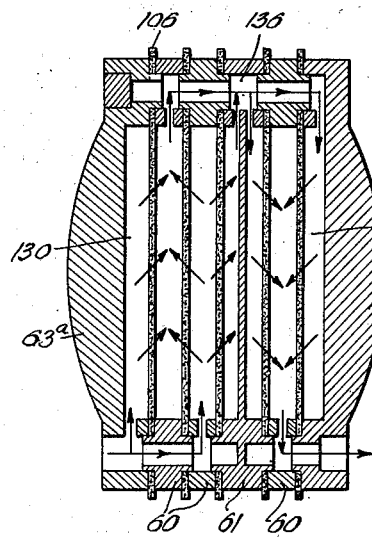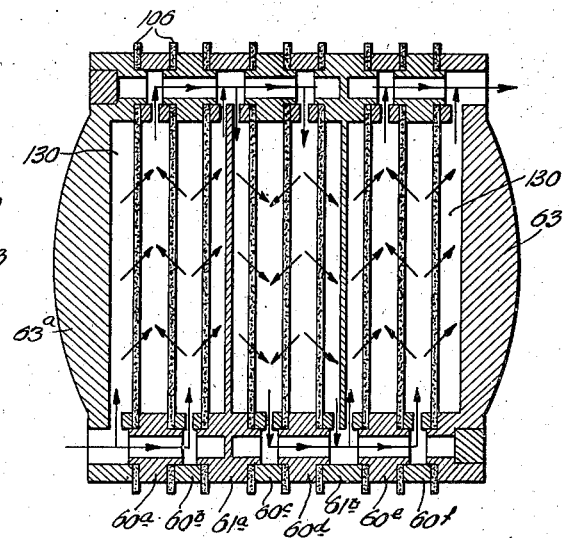

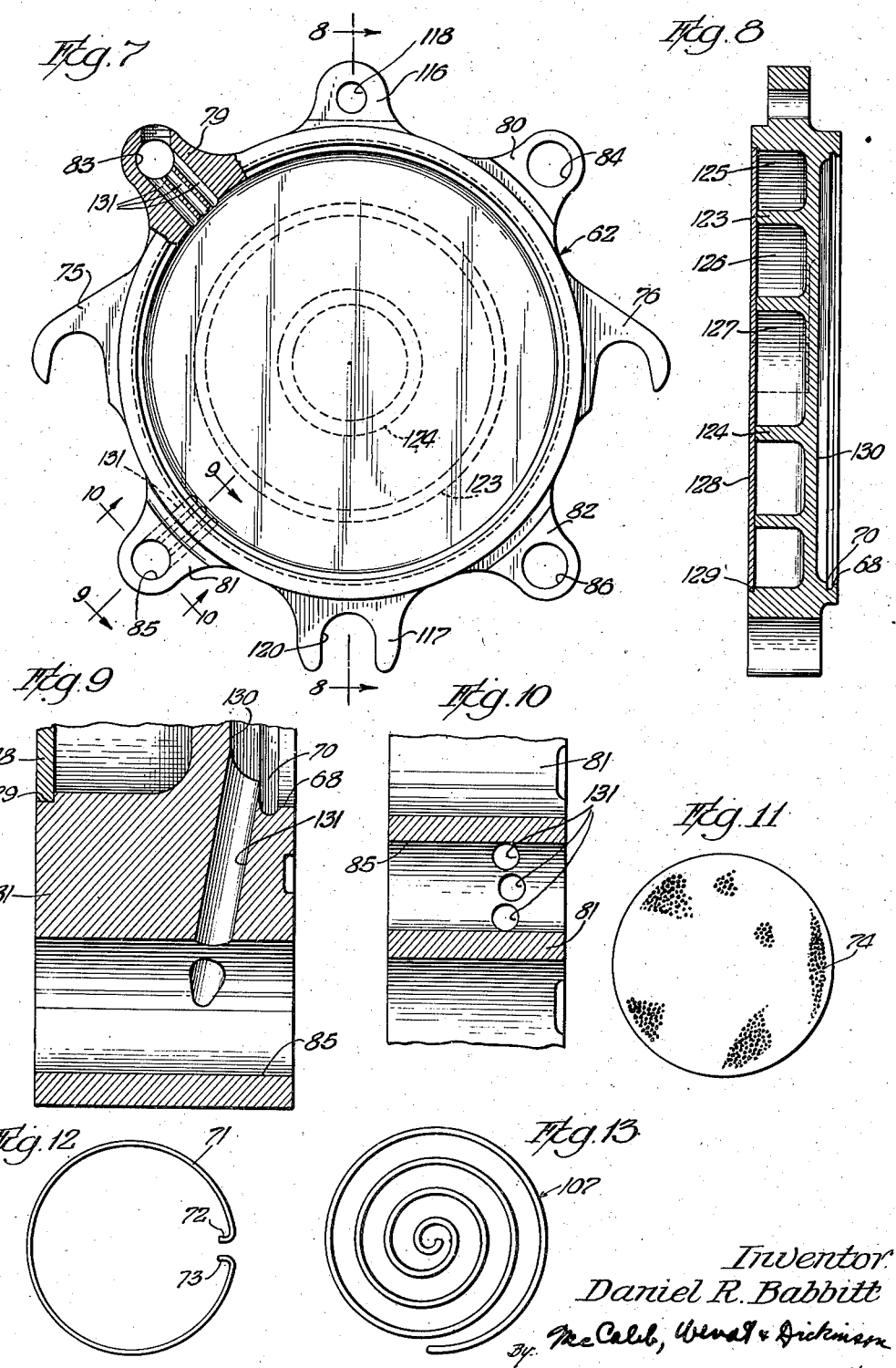

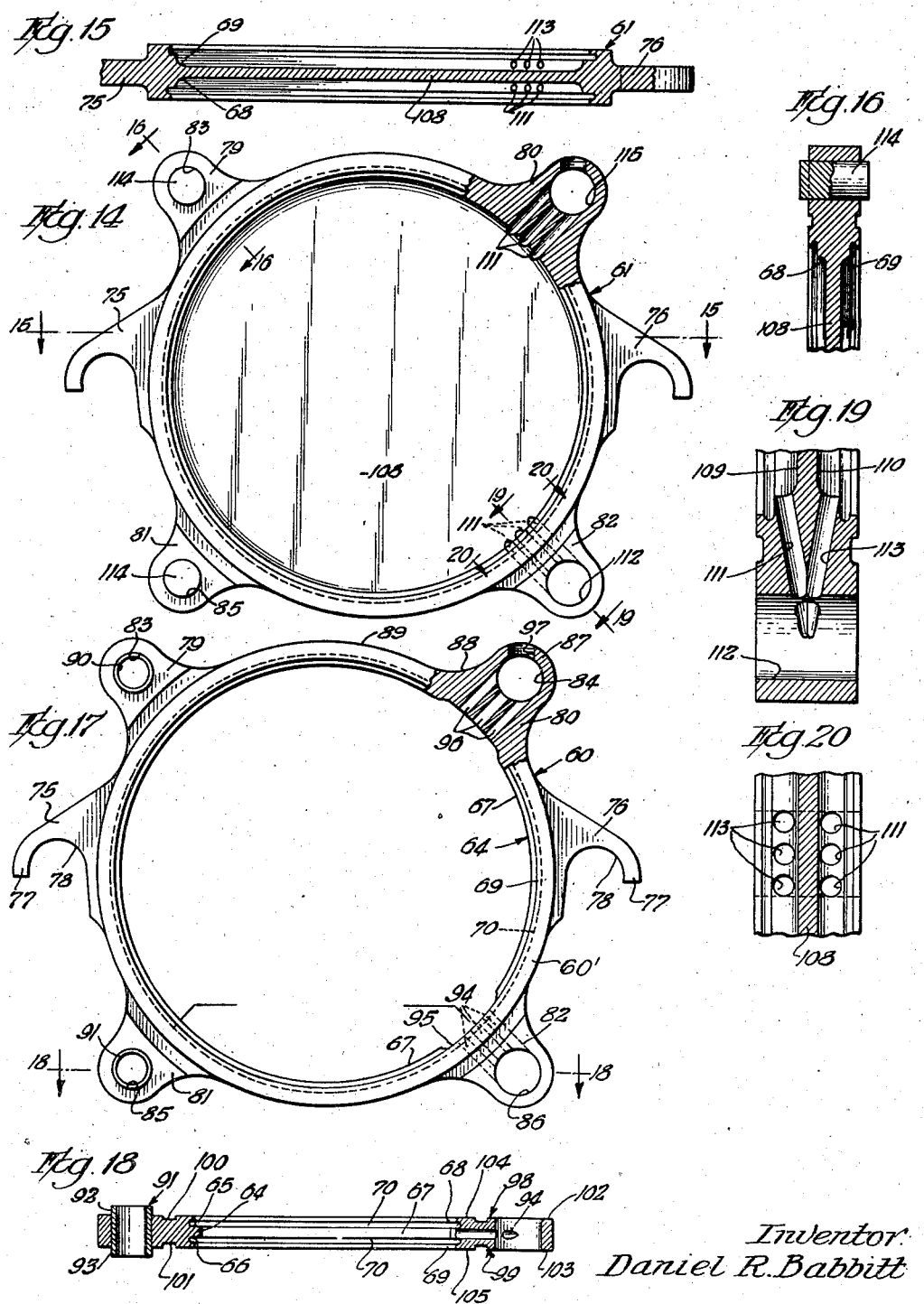

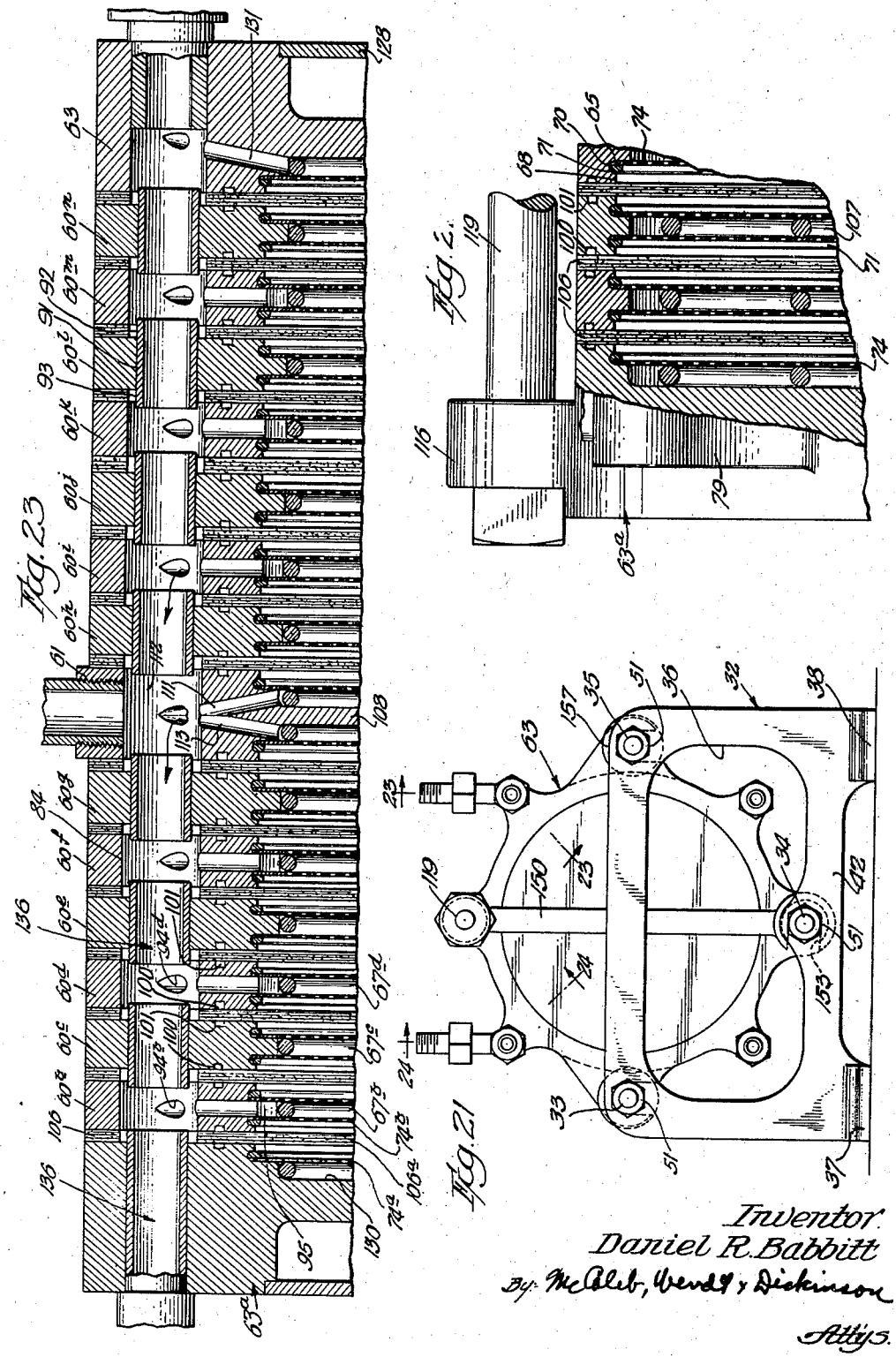

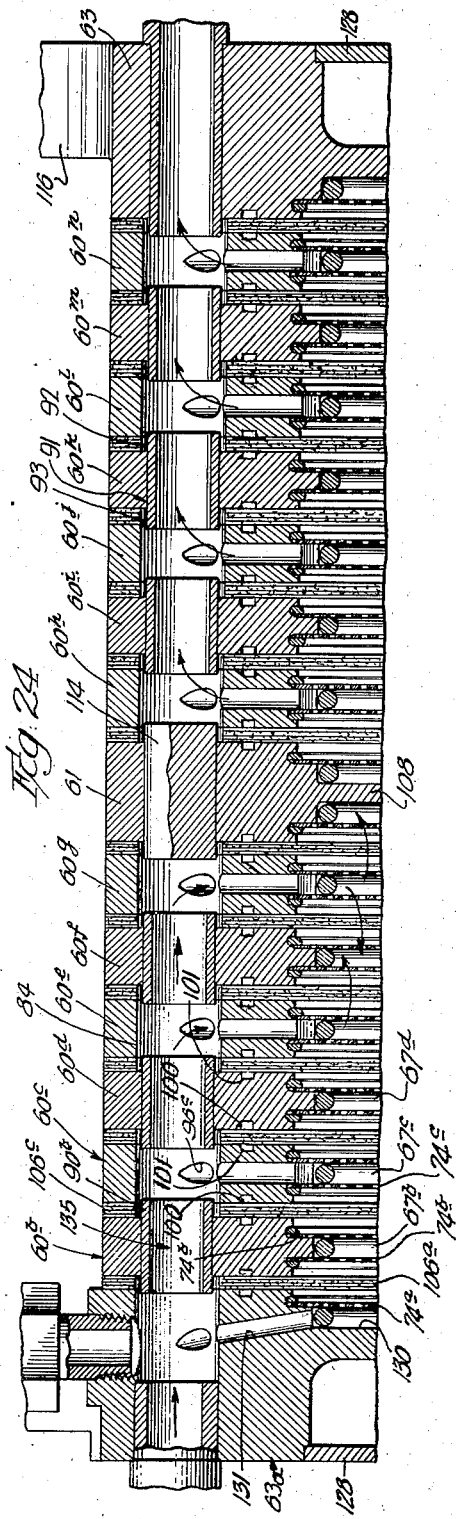

Patented Nov. 9, 1948

2,453,613

UNITED STATES PATENT OFFICE 2,453,613

SANITARY FILTER

Daniel R. Babbitt, San Francisco, Calif., assignor to Electric Steel Foundry, Portland, Oreg., a corporation of Oregon Application April 26, 1945, Serial No. 590,395

4 Claims. (Cl. 210—188)

The present invention relates to sanitary filters, and is particularly concerned with filters that are peculiarly adapted to be used for work in connection with the filtering of human blood albumin and other laboratory and sanitary processes.

One of the objects of the invention is the provision of an improved filter structure of the class described, all of the parts of which are adapted to be readily assembled or taken apart and adapted to be sterilized and wiped clean so that the product which has been passed through the cleaned and sterilized filter may be absolutely sterile.

Another object of the invention is the provision of an improved filter structure of the class described which may be utilized with various types of filter media and which may be embodied in filters having various amounts of filter surface, and which is adapted to be utilized both for pressure and for vacuum filtering.

Another object of the invention is the improvement of filters of the class described by providing a structure which has no cracks or pits or overlapping wires where small deposits of bacteria or organic matter can lodge, and in which the exposed parts can be machined all over so that there are no rough cast surfaces that will be difficult to clean and to maintain in a sterile condition.

Another object of the invention is the provision of an improved filter unit comprising a frame which is provided with suitable inlets and outlets and with foraminous filter plates against which the filtering medium is to be supported, the filter plates being separated by a grid which may be removed and which can be conveniently wiped off and sterilized.

Another object of the invention is the provision of an improved filter which is capable of economical manufacture and which is adapted to be utilized for a long period of time and disassembled and sterilized a great many times without danger of losing any of the parts and without operations which produce noticeable wear or destruction of any of the parts.

Another object of the invention is the provision of an improved filter structure which may be conveniently separated and sterilized and which is also adapted to be embodied in assemblies for single sheet filters, multiple sheet filters, double stage filtration, or triple stage filtration, or a multiplicity of stages, all by the use of similar types of units that may be assembled to produce these structures.

Other objects and advantages of the invention will be apparent from the following description and the accompanying drawings, in which similar characters of reference indicate similar parts throughout the several views.

Referring to the drawings, of which there are seven sheets,

Fig. 2 is a top plan view of the filter assembly of Fig. 1;

Fig. 3 is a diagrammatic sectional view taken on a plane passing through the axis and through the inlet and discharge ports of a single sheet filter assembly;

Fig. 4 is a view similar to Fig. 3 of a multiple sheet filter assembly;

Fig. 5 is a view similar to Fig. 3 of a two stage filter assembly;

Fig. 6 is a view similar to Fig. 3 of a triple stage filter assembly;

Fig. 7 is a front elevational view of one of the closed filter frames which is utilized for the ends of the assembly;

Fig. 8 is a sectional view taken on the plane of the line 8—8 of Fig. 7, looking in the direction of the arrows;

Fig. 9 is a fragmentary sectional view, taken on the plane of the line 9—9 of Fig. 7, looking in the direction of the arrows;

Fig. 10 is a fragmentary sectional view, taken on the plane of the line 10—10 of Fig. 7, looking in the direction of the arrows;

Fig. 11 is a plan view of one of the apertured filter plates;

Fig. 12 is a plan view of one of the snap rings for holding the filter plates in the frame;

Fig. 13 is a plan view of one of the separation grids or spacers for the filter plates;

Fig. 14 is a front elevational view of one of the closed filter unit frames which is utilized to separate the various series of open frames from each other to form different filtration stages;

Fig. 15 is a sectional view, taken on the plane of the line 15—15 of Fig. 14, looking in the direction of the arrows;

Fig. 16 is a fragmentary sectional view, taken on the plane of the line 16—16 of Fig. 14, showing how certain of the conduits are plugged in the separation frames to divide the assembly into different filtration stages;

Fig. 17 is a front elevational view, in partial section, of one of the open frames which is utilized between the closed frames and separation frames to form a filter assembly;

Fig. 18 is a sectional view, taken on the plane of the line 18—18 of Fig. 17;

Fig. 19 is a fragmentary sectional view, taken on the plane of the line 19—19 of Fig. 14;

Fig. 20 is a fragmentary sectional view, taken on the plane of the line 20—20 of Fig. 14;

Fig. 21 is an end elevational view of the filter assembly of Fig. 1;

Fig. 22 is a fragmentary sectional view, showing the mode of assembly of the various frames to form a filter assembly;

Fig. 23 is a fragmentary sectional view, taken on a plane passing through the axis of a conduit of a filter assembly, showing the mode of assembly of the parts at this conduit to provide a two stage filter, taken on the line 23—23 of Fig. 21.

Fig. 24 is a similar fragmentary sectional view, taken on the plane of the line 24—24 of Fig. 21, passing through another conduit of the assembly, showing how the separation plate or frame may be used to divide the assembly into two series or sections or stages.

Figure 1:
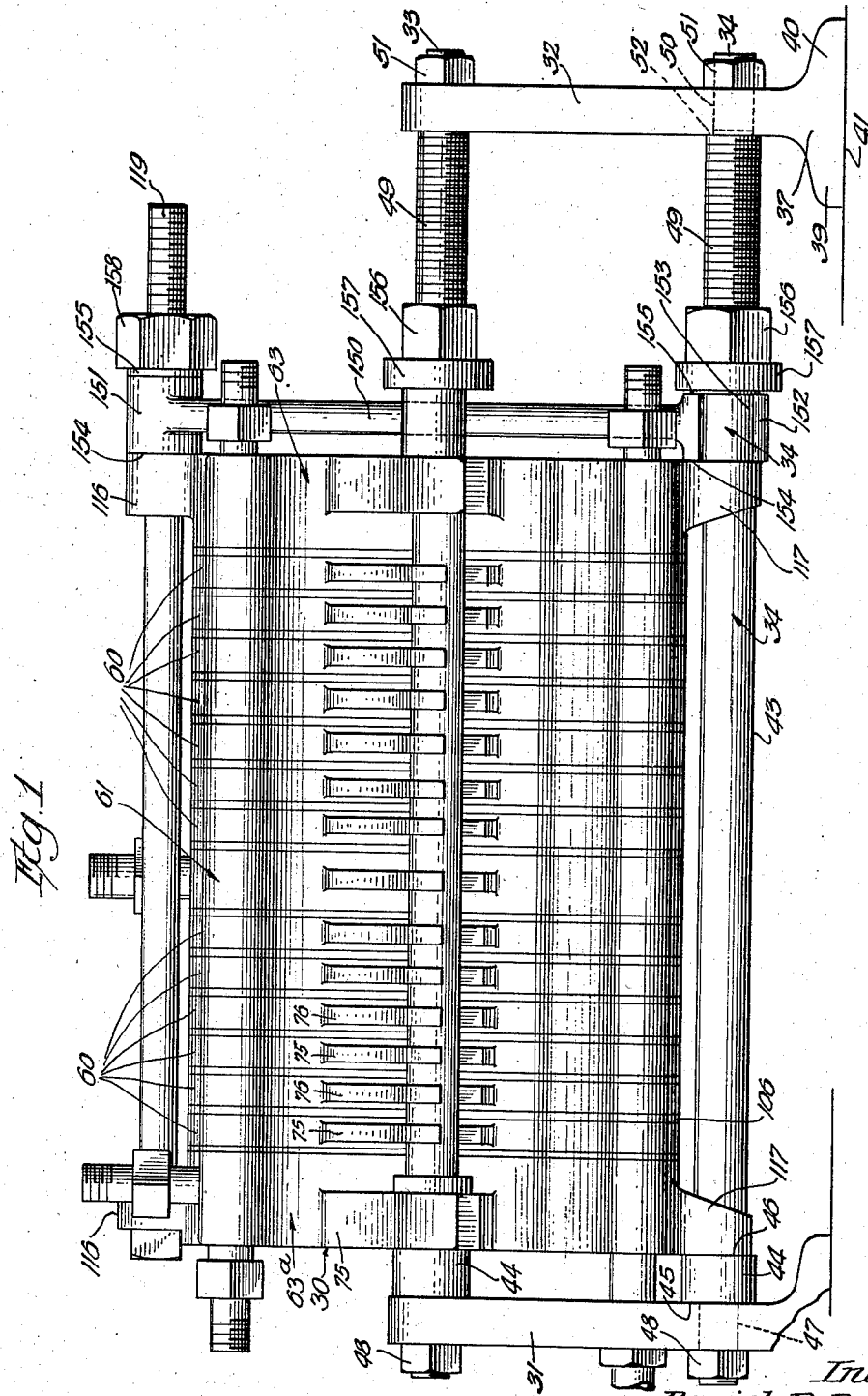
Fig. 1 is a side elevational view of a two stage filter embodying the invention.

Referring to Figs. 1 and 2, these are side elevational and top plan views of an exemplary filter assembly, indicated in its entirety by the numeral 30. This assembly preferably includes a pair of pedestals 31, 32, one of which is shown in front elevation in Fig. 21, and the pedestals are provided with a plurality, preferably three, supporting tie bolts 33—35 (Fig. 21). The two pedestals may be similar in construction, and each consists of a substantially rectangular member having a substantially rectangular aperture or cutout 36 for the purpose of reducing weight, and formed at its lower end with a pair of feet 37, 38, with forwardly and rearwardly extending foot flanges 39, 40 for increasing the area of the lower plane supporting surface 41.

The pedestals 31, 32 are provided with apertures at the upper corners for receiving the supporting tie bolts 33, 35, and with an aperture centrally located between their sides in the lower supporting frame member 42 (Fig. 21) for supporting the lower tie bolt 34 in a central position. The tie bolts 33—35 are preferably of the structure shown in Fig. 1, each bolt being provided with an elongated cylindrical shank portion 43 provided at its left end in Fig. 1, with an enlargement or intermediate head 44, which may be cylindrical, and which has the annular thrust surfaces 45, 46 for engaging the pedestal 31 and the left end of the filter assembly.

Beyond the head 44 the tie bolt 34 is provided with a threaded portion 47 and a clamping end 48 so that the pedestal 31 may be clamped between the nut and the annular surface 45. At its opposite end the tie bolt 34 is provided with a threaded portion 49 and with a reduced cylindrical portion 50 which is also threaded and provided with a nut 51. Between the two threaded portions 49 and 50 there is an annular shoulder 52, which engages the pedestal 32. Thus the pedestal 32 is clamped between shoulder 52 and the nut 51, and the structure of the other tie bolts 33 and 35 is similar, and they are secured to the pedestals 31 and 32 in the same way.

Thus the pedestals and tie bolts constitute a supporting structure upon which the filter press may be supported. The tie bolts may also be used to effect a clamping action wherever desired.

The filter press assembly may be built up of a plurality of types of filter units or filter supporting elements. Among these units the most common one is the open screen frame of the type exemplified in Fig. 17, indicated in its entirety by the numeral 60.

Another form of filter supporting element is the closed separator type of screen frame shown in Figs. 14 and 15, and indicated in its entirety by the numeral 61. A third form of filter supporting element is the stationary end press plate of the type shown in detail in Figs. 7 and 8 and indicated by the numeral 62.

Referring now to the filter assembly of Fig. 1, it will be seen that there are two of the end press plates which have been indicated by the numerals 63a and 63, one separator frame 61, which separates the filter assembly into two stages, and a multiplicity of the open screen frames 60 on each side of the separator frame 61. For example, there are six screen frames on the left side of the separator frame 61 between this separator frame and the press plate 63a.

All of the parts of the filter assembly, including those previously described and those further to be described, are preferably made out of non-corrodible metal adapted to receive a smooth polished finish, such as, for example, stainless steel, and so far as possible rough surfaces as cast are eliminated from the filter parts, particularly those parts which come in contact with material to be filtered, so that they can be wiped clean and sterilized to maintain bacteriologically sanitary conditions.

Referring now to Figs. 17 and 18, this is one of the open screen frames, and it preferably comprises a substantially annular member 60 which has an inwardly extending centrally located rib 64 with annular surfaces 65 and 66 on each side of it. The inner surface of the rib may be cylindrical at 67, defining a cylindrical through bore, and at each end of the screen frame through bore 67 communicates with counterbores 68, 69. Each of the counterbores 68, 69 is provided adjacent the thrust surfaces 65 or 66 with an annular groove 70 which is concentric with the bore 67, and the grooves 70 are preferably substantially semi-circular in cross section so that they are adapted to receive the snap rings 71 (Fig. 12).

The snap rings 71 are preferably made of plate metal, and are flat on one side and of such cross section that they are formed on a radius of a circle on the opposite side. Each snap ring is formed to a circle which is substantially larger than that of the groove in which it is to be placed so that the rings are tensioned to spring outward into the groove, and each ring may cover almost the complete circumference of a groove. The ends of the ring are open, and are provided with radially inwardly extending portions 72, 73 between which a tool may be inserted, such as a screw driver, so that the tool may be twisted to force the ring out of its groove.

The size of each ring in relation to the groove 70 is preferably such that when a screen sheet 74 (Fig. 11) is placed in one of the counterbores 68 or 69 against the annular shoulder 65 or 66, there is still space in the groove 70 so that the snap rings may spring out into the groove. The round portion of each snap ring is then on the outside, and as it engages the round surface of the groove it tends to force itself outwardly farther into the groove and at the same time to cam the screen sheet inwardly against the annular shoulder 65 or 66.

The radial thickness of the snap rings is such that when it is in the groove the snap ring overlaps the edge of each screen sheet.

As the snap rings overlap the edges of the screen sheets, these rings are adapted to hold the screen sheets tightly in the filter frames, and each open filter frame of the type 60, shown in Fig. 17, is provided with a pair of such screen sheets and snap rings.

The screen sheets are preferably made of thin sheet metal, such as, for example, No. 26 U. S. gauge sheet, and these sheets are perforated with relatively small diameter holes, such as, for example, one-sixteenth of an inch diameter, all of the perforations being kept within a predetermined margin, which is determined by the size of the bore 67 in the frame, and the holes being located very close to each other.

For example, in one embodiment of the invention there are approximately 100 holes to the square inch, and with a seven inch inner diameter area for the holes, the total number of holes is approximately 3,987. The holes are smoothly shaped, and all burrs are removed so that such screen sheets can be wiped clean, and any foreign matter which happens to lodge in the holes can be removed by the pressure action of liquid used in the cleaning of the screen sheets. Each of the screen frames 60 (Fig. 17) is preferably provided with a pair of laterally projecting lugs 75, 76 located diametrically opposite to each other and provided with downwardly extending end portions 77 and semi-circular grooves 78 which fit on the tie rods, the screen frames being mounted for sliding movement upon the tie rods which are carried by pedestals 31, 32.

In addition to the hooked lugs 75, 76, each screen frame is preferably provided with a plurality of radially extending lugs 79, 80, 81, 82, which are of sufficient size so that they may be provided with through bores 83, 84, 85, 86 adapted to serve as conduits.

The external shape of the lugs 79—82 may vary considerably, but they are preferably provided with partially cylindrical outer surfaces 87, which are also provided with concavely filleted portions 88 at their junctures with the outer cylindrical surface 89 of the screen frame. Thus the external surfaces are easy to clean.

Certain of the through bores, as for example 83 and 85 in the lugs 79 and 81, may be used to support the screen frame tubes 90, 91 comprising short lengths of metal tubes having inner and outer cylindrical surfaces and of sufficient length to project beyond the screen frame at each side, as shown in Fig. 18.

The projecting portions 92, 93 of the tube 91 in Fig. 18 project sufficiently so that they may be received in bores of adjacent frames of the type 84 and 86 without, however, extending over or closing the conduits 94, 95 (Fig. 18), which provide communication between the bore 67 of each screen frame and the conduits 84 and 86.

These conduits 94 are shown in Fig. 17 as extending radially inwardly from the bore 67, there being three conduits communicating with the conduit 86, and the ring is preferably provided with a relief or cut-out 95 wherever drilled radial conduits 94 are located. In the same way, drilled conduits 96 at the top of Fig. 17 provide communication between the bore 67 and the conduit 84 in lug 80.

Some of the screen frames 60 may have their conduits 84 provided with a threaded bore 97 on its upper side for use in communicating with inlet pipes, outlet pipes, or pressure gauges, or the like; but the majority of the screen frames, where many are used, need not have the bore 97.

The tube 91 or 90 may be integral with the screen frame, but, if not, it preferably has a tight frictional fit in the bore 83 or 85 so that it is fixedly secured in the screen frames. The fit of the projecting end portions 92, 93 of each tube 91 in the adjacent bores 84, 86 of the adjacent screen frames is not of importance because the leakage out of the assembly is prevented therebetween by the clamping of the filter element between the frames, after the manner of a gasket.

Each screen frame is preferably provided with the substantially plane end surfaces 98, 99 so that the screen frames may be assembled adjacent each other in such manner that filter elements may be clamped between each surface 98 and the adjacent surface 99 of another frame. The surfaces 98, 99 are, however, preferably provided with annular grooves 100, 101 located inwardly of the conduits 83—85 and concentrically with respect to the through bore 67.

The grooves 100, 101 separate the plane end surfaces 98 and 99 on each face of the screen frames into two portions, an outer portion 102, 103, and an inner clamping portion 104, 105 for engaging the filter medium.

Various types of filter media may be employed, such as, for example, in the first stage a filter paper may be used for eliminating the glutinous substance and constituting a clarification section. In the second stage of the filter a bacteriological filter medium may be used which removes all bacteria. These filter media are generally indicated by the numeral 106 in the filter assemblies, and they are located between each of the screen frames and between each endmost screen frame and the adjacent screen separator frame or press plate.

Each screen frame is also preferably provided with spacer means located in the bore 67 for maintaining the spacing of the two screen plates 74. The spacer means is preferably of the same metal and is of such shape that it can be easily cleaned, and such a spacer is shown in Fig. 13.

It comprises a spirally formed circular wire, the outer convolution of which is smaller than the bore 67. The diameter of the wire is preferably equal to the length of the bore 67, that is, the distance between the annular surfaces 65 and 66, such as, for example, $\frac{3}{16}$", and the outermost convolution may be turned inwardly at its end so that the outer shape of the spacer is substantially circular.

The spiral coil spacer is indicated in its entirety by the numeral 107 (Fig. 13). One such spacer is used in each screen frame 60 to prevent the screen plates 74 from collapsing against each other.

Referring to Fig. 14, this separation frame 61 is similar to the open screen frame 60 in its externally shaped hooked supporting lugs 75, 76 and projecting lugs 79—82 with conduits. It differs from the open frame 60 in that there is no bore 67; but, on the contrary, there is an integral partition 108, which closes one counterbore 68 from the other counterbore 69 (see Fig. 15).

The partition is provided with a cylindrical recess 109, 110 on each side, and a plurality of drilled conduits 111 extend from the recess 109 to the conduit 112, a plurality of similar drilled recesses extend from the recess 110 to the conduit 112 (see Fig. 19).

In this case the bores 83 and 85 are preferably plugged with a solid cylindrical member 114 (Fig. 16), while both the conduits 112 and 115 have the drilled holes 111 and 113 providing communication with the recesses on the opposite sides of the partition 108.

The drilled holes 111, 113 extend diagonally in this closed screen frame; and the closed screen frame 61 is adapted to separate the filter press into two stages.

Referring to Figs. 7 and 8, these are views of one of the end press plates, upon which pressure is exerted by various threaded members for making the assembly liquid-tight at the joints between the frames. The end press plate, illustrated in Fig. 7, may be plate 63a of Fig. 1, and it is preferably constructed as follows. This end press plate consists of a substantially cylindrical metal member, which again has the laterally projecting hook lugs 75, 76 and the four radially projecting lugs 79—82 provided with the through conduits 83—86. In this case the end press plate is of substantial thickness, and is preferably provided with additional upper and lower bolt-engaging lugs 116, 117.

The upper lug 116 is provided with a bore 118 for receiving a clamp bolt 119. The lower lug 117 may be forked, having a slot 120 so that it may be placed over the shank of bolt 34 carried by a pedestal 32. Thus the end press plate 63a has a three-point support on the tie rods that are carried by the pedestals.

In order to provide maximum strength with minimum weight, the end press plate 63a may be provided with a plurality of annular reinforcing ribs 123, 124 on its rear side, leaving annular grooves 125, 126 and a cylindrical recess 127.

The annular ribs 123 may stop short of the rear surface of the end press plate 63a so that they engage a cover plate 128 of sheet metal, which is rabbeted in a recess 129 in the end press plate and secured in place by welding or other means of holding, such as soldering, screw pins, etc.

Thus the recesses in the rear side of the end press plate are closed and made liquid-tight so that there can be no access to these recesses by foreign matter. The sheet metal plate which closes them is, of course, easy to clean, and permanently attached.

The other side of the end press plate 63a is provided with a circular dished recess 130 and with the same counterbore 68, previously described, for the open frames, and with the same groove 70 of circular cross section, for receiving snap wire.

Drilled holes 131 extend radially from the recess 130 to conduits 83 and 85 so that a screen plate 74 may cover the face of the recess 130, to provide a backing for a filter medium, and the liquid which filters through it is discharged through conduit 85, through drilled holes 131.

In every case the screen sheet 74 is supported against buckling by a spacer 107.

Referring now to Fig. 22, this figure shows a fragment of one of the parts of a plurality of frames provided with spacers, snap wires, screen sheets, and the filter medium in between each pair of frames. This is exemplary of the construction of the filter assembly throughout.

Referring now to Figs. 23 and 24, these are views showing the inlet and outlet conduits and showing the alternate arrangement of the frames so that the tube 91 in one frame extends into the unfilled conduits of similar location in the other frame, which is merely reversed in position.

The way to provide the alternate arrangement of the frames so that the tube 91 in one frame extends into the unfilled conduits of similar location in the other frame is to invert a frame of the type of Fig. 18. When the frame is inverted, the empty conduits will then appear at the right in Fig. 18. The frame is then in position to engage the projecting portions 92, 93 of the tube 91 of the frame which has not been inverted and shown in its normal position in Fig. 18.

Thus an assembly of screen frames may be arranged with the frames alternately reversed in position so that tubes 91 provide communication between the aligned bores 84, 86 in the adjacent screen frames.

Referring to Fig. 7, any two of the conduits 83—85 may be utilized as inlet conduits, while the other two may be utilized as outlet conduits. The sectional views shown in Figs. 23 and 24 may be views taken at any one of these four conduits; but, if one of these is utilized as an inlet, then those which are utilized as outlet conduits must be of the other type. For example, referring to Fig. 24, suppose the conduit, which is indicated in its entirety by the numeral 135, is an inlet conduit formed by the aligned tubes and bores in the various frames, the fluid coming in at the left end would pass downward through the apertures 131 in the end press plate 63a into the cylindrical depression 130, thence through the screen plate 74a, and filter medium 106a, and through the screen plate 74b, into the bore 67b of the first open frame, which is indicated by the numeral 60b.

It will be noted that the tube 90b at the top of this screen frame 60b merely provides a part of the conduit 135 and has no drilled holes communicating with the bore 67b.

Before showing how the fluid passes out of the space 67b, we shall continue with other screen frames and show the course of fluid into these spaces. Additional parts of the fluid may pass down the conduits 96c into the space 67c in the open screen frame 60c.

This fluid may pass toward the left and the right, and that which passes toward the left will go through the screen plate 74c and through the filter medium 106c, and through the screen plate 74b, which is located on the right side of the bore 67b, and thence into the bore 67b.

Additional fluid which passes into the space 67c will go to the right through two screen plates and the intermediate filter medium into the space at 67d.

It will thus be observed that in so far as the open frames are concerned each alternate one is in communication with the conduit 135 at the top.

Referring now to Fig. 23, let us suppose conduit 136 is serving as an outlet conduit. The liquid which has passed into the bore 67b in Fig. 24 can now pass out of the apertures into conduit 136. Liquid which has found its way through screen plates and filters to the space 67d can pass out of the drilled holes 94d at the top of Fig. 23 into conduit 136.

Thus it will be observed that the filter media which are carried between these end press plates and the adjacent open screen frames are connected in parallel, and the amount of filter surface available may be increased by using more screen frames and filter media between them.

Referring now to Fig. 24, and in particular to the separation plate 61, conduit 135 is closed by means of a plug 114 in this separation plate. This prevents liquid in the left end of conduit 135 from passing into the right end except by going through another series of filter plates.

Referring to Fig. 23, it will be observed that the outlet conduit 136 is open from end to end. Its ends may, of course, be closed by suitable plugs, or may be connected to a container for the filtrate.

Arrows have been drawn on both of these figures to show the course of the fluid through the filter press.

When conduit 135 is used as an inlet in a multiple sheet filter, as illustrated in Fig. 4, no separation plate 61 is used, and the right end of the inlet is plugged, then, each alternate screen frame is also used as an inlet at that side of the assembly. This means that frames 63a, 60c, 60e, 60g, 60h, 60j, 60l and 60n have inlets 96 from the conduit 135.

Every other alternate frame as shown in Fig. 23, at the other side of the frames, is used as an outlet member. Thus the frames 60b, 60d, 60f, 61, 60i, 60k, 60m and 63 serve as outlets to the conduit 136.

The assembly shown in Figs. 23 and 24 may be used as a two-stage filter by using one end of conduit 135 as an inlet, that is, the left end; and the other end, that is, the right end, as the outlet.

The left end of conduit 135 in Fig. 24 serves as an inlet, the filtrate passing through the frames and filter elements which are at the left of the separator plate 61 into that portion of the conduit 136 which is at the left of the separator plate 61. Thence the fluid passes over into the right-hand part of conduit 136 into the frames which are located at that side and which are provided with suitable conduits communicating with the right end of conduit 135, which may be the outlet.

In order to provide for the relatively quick separation of the frames and quick and very uniform clamping action on the frames, the right end of the assembly (Fig. 1) is preferably provided with a clamp bar 150, which is arranged to engage the tie bolts 119 and 34.

This clamp bar comprises an elongated metal member having a hub 151 at its upper end provided with a bore for passing the tie bolt 119. At its opposite end it has a hub 152 provided with a slot 153 extending laterally into the hub and terminating in a rounded portion adapted to receive the tie bolt 34.

The hubs 151, 152 are each provided with plane end surfaces 154, 155 so that when the clamping nuts 156 and 158 are driven home on the tie bolts 34 and 119 the clamp bar 150 engages the assembly of frames and causes them to clamp the intermediate filter media between them.

When the nuts on these tie bolts are loosened, the clamp bar 150 may be pivoted in a counterclockwise direction in Fig. 21 to release the tie bolt 34 from slot 153, whereupon the filter assembly may be lifted from the pedestal assembly. The tie bolts 33 and 34 may be provided with intermediate nuts 156 and clamping ferrules 157 so that they may also exert a clamping force upon the complete assembly.

Referring now to Figs. 3 to 6, these are diagrammatic illustrations showing how various types of filter assemblies may be made.

In Fig. 3, 63a indicates one press frame, and 63 the other; 106 indicates the filter media. The frames are so arranged that the inlet is at the bottom, the fluid to be filtered passing into the space 130 of one press plate, through the screen plate (not shown), filter media 106; and the other screen plate (not shown) into space 130; and thence out of the outlet at the top of the assembly. Thus two press plates may be used to make a single sheet unit.

In Fig. 4, this is a diagrammatic illustration showing a multiple sheet filter. In this case the inlet is at the bottom and the outlets are all at the top, and a multiplicity of the open frames 60 and filter media 106 are employed, but there is no separator frame.

Referring to Fig. 5, this is a two-stage filter assembly in which there are more frames utilized in the pre-filtration stage than in the second filtration stage. Here the inlet is at the bottom left, and two end press plates 63a and 63 are used, while a separator plate 61 separates the stages.

In the left stage there are two open filter frames 60, and the fluid passes in at the bottom and out at the top, into the conduit 136. Thence it passes over to the right end of the conduit, downward, into the right stage, which consists of a single open frame 60 and the press plate 63. The outlet is at the right, bottom.

Referring to Fig. 6, this is an illustration showing a multiple stage or triple filtration assembly. The first stage extends from the press plate 63a to separator plate 61a and also includes the intermediate open frames 60a, 60b. The second stage extends from the separator plate 61a to the separator plate 61b and includes the open frames 60c, 60d. The third stage extends from the separation frame 61b to the end press plate 63 and also includes the open frames 60e and 60f.

Referring to the arrows showing the direction of flow, it will be seen that the liquid flows in at the bottom, up to the top, down to the bottom again, and up to the top. In any particular filter assembly the direction of flow depends entirely upon the arrangement of the filter plates when they are set up in the laboratory.

It will thus be observed that I have invented an improved sanitary filter assembly, all of the parts of which may be conveniently wiped clean and sterilized. The assembly is readily disassembled, it can be polished, and it can be as easily put back together. There are no screens having crossed wires or other parts which have recesses that are difficult to clean and apt to collect foreign matter. The screen plates are made of sheet metal, provided with a multiplicity of perforations, and they are supported by spacers of spiral wire, which are also easily cleaned. Since the inside of the screen frames is circular, it may be machined to a smooth surface and polished at a minimum expense, and the filter elements are adapted to be cleaned without difficulty.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. In a sanitary filter structure, a filter unit which, in combination with a co-acting part of the filter structure is adapted to grip the marginal portion of a filter medium, said filter unit comprising screen plates, a metal frame provided with a through bore of circular shape, a counterbore at each end of said frame for supporting a screen plate, and an annular groove in each end of the metal frame extending axially into the frame in radially spaced relationship to the counterbore and concentric with the through bore, the end surfaces of said frame between the annular grooves and the counterbores providing clamping surfaces for said filter medium, said counterbores at opposite ends of the frame being separated by an inwardly extending annular frame portion providing annular shoulders adjacent the counterbores, the screen plate in each counterbore engaging one of said annular shoulders of the frame, the axial surface of each counterbore being provided with an annular groove concentric to the through bore and extending radially into the axial surface of the counterbore, a resilient spring member located in each of said counterbore grooves, each of said spring members extending inwardly toward the through bore from one of the grooves sufficiently to overlap the margin of the screen plate and retain it in the frame against one of said shoulders.

2. In a sanitary filter structure, a filter unit which, in combination with the co-acting part of the filter structures, is adapted to grip the marginal portion of a filter medium, said filter unit comprising screen plates, a metal frame provided with a through bore of circular shape, a counterbore at each end of said frame for supporting a screen plate, and an annular groove extending axially into each end of the metal frame and spaced radially of the counterbore in concentric relationship to the through bore, the frame end surface between the annular groove and the counterbore providing a clamping surface for said filter medium, the counterbores at opposite ends of the frame being separated by a portion of the frame extending inwardly in a radial direction and providing annular shoulders at the inner ends of the counterbores, the screen plate in each counterbore engaging one of said annular shoulders and being carried by said frame, the axial surface of each counterbore being provided with an annular groove concentric with the through bore, a resilient spring member located in each of the counterbore grooves, each of said spring members extending inwardly toward the through bore from one of the grooves sufficiently to overlap the margin of the screen plate and retain it in the frame and against one of said shoulders, each of said resilient spring members also being provided with a flat surface on the side engaging the screen plate and with an outwardly diverging surface on its opposite side for wedge-like engagement in the groove.

3. In a sanitary filter press assembly including a supporting member consisting of a pair of pedestals, the said pedestals being joined by a plurality of tie rods, a filter press structure carried by said tie rods and comprising a pair of end press plates, the said end press plates being provided with projecting slotted lugs engaging a plurality of said tie rods for supporting the press plates, each press plate also being provided with passages and a conduit adapted to be used for fluid inlet or outlet, and each press plate having therein an annular counterbore terminating near a wall and defining a substantially circular recess between the end of the counterbore and said wall, a plurality of perforated screen plates, one of said perforated screen plates fitting into the counterbore of each press plate and covering the recess, the axial surface of the counterbore of each press plate also having an annular groove therein spaced from and concentric with the wall, and a spring wire located in said groove in each press plate for holding each screen plate in place against the end surface of the counterbore, there being also a plurality of open metal screen frames located between said press plates, each of said open screen frames having a through bore, said open frames also being counterbored at each end in concentric relationship to their through bores, said counterbores being separated by an inwardly extending annular frame portion providing shoulders, and a screen plate located against each of said shoulders, each of said frame counterbores also having an annular groove in the axial surface thereof and concentric with the through bore, the latter screen plates being secured against said shoulders by resilient members sprung into said annular grooves in the open frames, a spirally formed spacer between said screen plates, and there being a filter medium between the end face of each press plate and the end face of the adjacent open screen frame and between the opposing end faces of each pair of screen frames so as to receive and support the filter medium against movement, and said passages providing connections for communication between said conduits and recesses whereby fluid to be filtered may pass in one end plate through the filter media and open frames and out of the other press plate.

4. In a sanitary filter press assembly including a supporting structure consisting of a pair of pedestals joined by a plurality of tie rods, a filter press structure carried by said tie rods and comprising a pair of end press plates, the said end press plates being provided with projecting slotted lugs engaging a plurality of said tie rods for supporting the press plates, each press plate also being provided with a conduit adapted to be used as a fluid inlet or outlet, and each press plate having therein an annular counterbore terminating near a wall and defining a substantially circular recess between the end of the counterbore and said wall, a plurality of perforated circular screen plates, each of said perforated screen plates fitting into the counterbore of each press plate and covering the adjacent recess, the axial surface of the counterbore of each press plate also having an annular groove therein concentric with and spaced from the wall, and a spring wire located in said groove in each press plate for holding each screen plate in place against the end surface of the counterbore, there being also a plurality of open metal screen frames located between said press plates, each of said open screen frames having a through bore and being provided at each end of the through bore with a plane annular thrust face, and a screen plate located against each thrust face, annular grooves in said frames adjacent each of said thrust faces and concentric with the through bore, the latter screen plates being secured against the thrust faces by resilient members sprung into the annular grooves in the open screen frames, spirally formed spacers between the screen plates of each screen frame, and there being a filter medium between each end press plate and the adjacent open screen frame and between each pair of screen frames, the open screen frames being separated into two series by a separator plate disposed between the screen frames of the series, said separator plate being integrally constructed to provide an annular side wall, a partition wall extending across the through bores of the screen frames of the filter press assembly and a conduit outside of the side wall, and fluid passages in said press plates and separator plate connecting said conduits to said recesses and the spaces adjacent said screen plates on opposite sides of the partition wall, the said conduits being connected and arranged for fluid flow first through a plurality of filter media supported by the screen frames and press plates on one side of the separator plate, then through the conduit of the separator plate, and thereafter through a plurality of filter media supported by frames and plates on the other side of the separator plate to provide two stages of filtration.

DANIEL R. BABBITT.

REFERENCES CITED

The following references are of record in the file of this patent:

UNITED STATES PATENTS

| Number | Name | Date |
|---|---|---|
| 407,221 | Kleeman | July 16, 1889 |
| 550,639 | McKeone | Dec. 3, 1895 |
| 564,422 | Dehne et al. | July 21, 1896 |
| 571,368 | Hubner | Nov. 17, 1896 |
| 608,034 | Feroe | July 26, 1898 |
| 638,949 | Ackerman | Dec. 12, 1899 |
| 846,582 | Lieberich | Mar. 12, 1907 |
| 863,894 | Arendt et al. | Aug. 20, 1907 |
| 1,062,942 | Woods | May 27, 1913 |
| 1,918,836 | Demers | July 18, 1933 |
| 2,024,955 | Teatini | Dec. 17, 1935 |
| 2,076,049 | Sietz | Apr. 6, 1937 |
| 2,174,265 | Holt | Sept. 26, 1939 |
| 2,382,656 | Obenshain et al. | Aug. 14, 1945 |

FOREIGN PATENTS

| Number | Country | Date |
|---|---|---|
| 15,389 | Great Britain | 1904 |
| 41,914 | France | Mar. 31, 1932 |

(1st addition to No. 696,990)